United States Patent Office 3,115,009
Patented Dec. 24, 1963

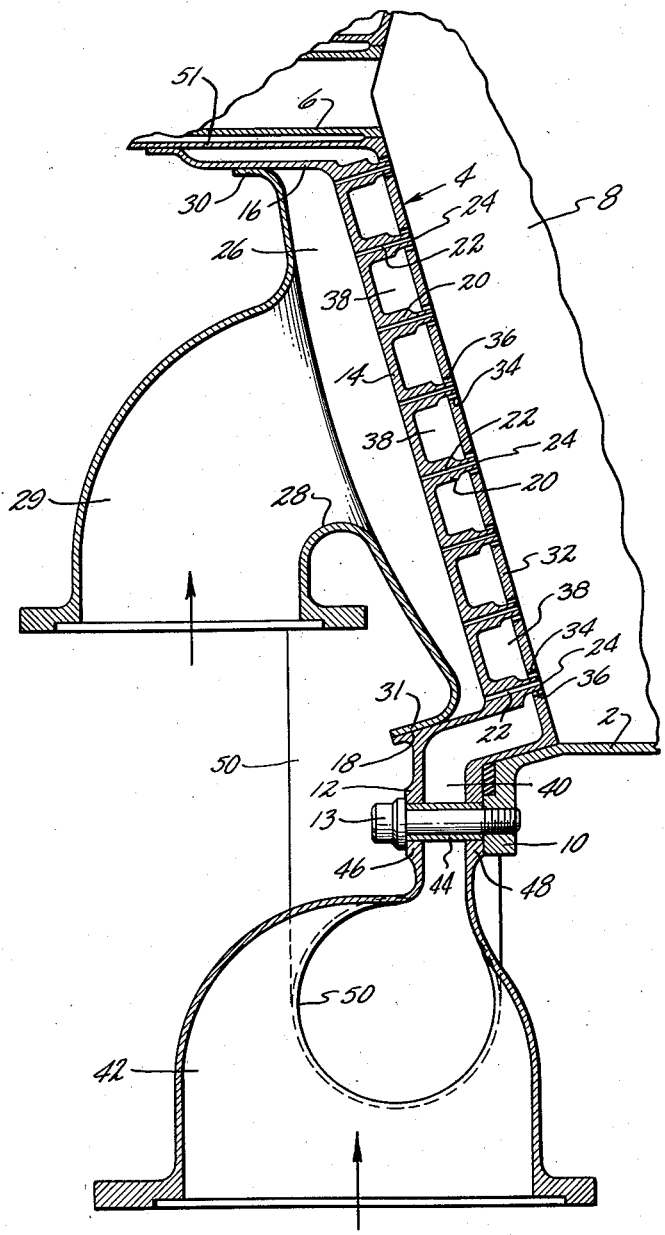

3,115,009
INJECTOR HEAD FOR ROCKETS
Walter A. Ledwith, Glastonbury, Augustus Hasbrouck, Middletown, and Frank Lattanzio, West Hartford, Conn., assignors to United Aircraft Corporation, East Hartford, Conn., a corporation of Delaware
Filed June 17, 1959, Ser. No. 821,067
2 Claims. (Cl. 60—35.6)

This invention relates to rockets and more particularly to an injector head for the rocket chamber.

One feature of the invention is an injector head by which two propellants may be injected without the likelihood of any intermingling of these propellants until they reach the main rocket chamber. Another feature is the delivery of a propellant through the structure by which the injector head is attached to the combustion chamber wall. Another feature is a dividing plate forming propellant compartments, with integral projections on the plate to eliminate leakage of propellants at this point. Another feature is the elimination of brazed joints between the two propellant chambers.

One feature of the invention is a main plate having projecting nozzles on one side thereof with passages for the nozzles communicating with the opposite side of the plate together with a chamber on each side of the plate with the propellants separately supplied to the opposite chambers. Another feature is the arrangement for radial inflow of one of the propellants across the injector face.

Other features and advantages will be apparent from the specification and claims, and from the accompanying drawing which illustrates an embodiment of the invention.

The single FIGURE is a fragmentary transverse sectional view of a rocket chamber head.

The invention is shown in conjunction with a rocket chamber having a side wall 2 and a head 4, the latter having a centrally located opening 6 in which an ignitor, not shown, may be positioned. The head 4 is constructed for the injection of two distinct propellants, that is to say, a fuel and oxidizer, into the main rocket chamber 8. The injector head may be suitably attached to the annular side wall 2 as by a bolting flange 10 on the side wall and a cooperating ring 12 on the head, bolts 13 holding these parts together.

The injector head includes a main plate 14 which at its inner edge carries a sleeve 16 and which at its outer edge has a frusto-conical surface 18. The plate 14 carries on one side thereof a plurality of integral projecting elements 20 each having a centrally located passage 22 therein and each terminating in a nozzle 24. All of these nozzles 24 are spaced from the plate 14 and are preferably uniformally arranged over the area of the plate. The passages 22 communicate with a chamber 26 on the side of the plate remote from the projections.

The chamber 26 is defined between the plate 14 and a cap 28 secured as by welding or brazing to the frusto-conical surface 18 at its periphery and to the sleeve 16 adjacent the center. The cap or casing 28 has an integral inlet duct 29 through which one of the propellants, for example, an oxidant, is directed to the chamber 26 and thence through the nozzles 24. The cap has peripheral flanges 30 and 31 at inner and outer peripheries to engage with sleeve 16 and surface 18, respectively, such that, should leakage occur at the weld or braze attachment the propellant would escape to the atmosphere.

The cap 28, with its inlet duct 29, provides a relatively small volume for the chamber 26 such that a control valve, not shown, located in or adjacent to the inlet 29 will have downstream of the valve only a small volume to be filled by propellant on starting of the rocket and, similarly only a small volume of propellant to escape from the chamber 26 on shutdown.

A second plate 32 is mounted in spaced relation to the plate 14 and on the same side of the plate as the projections 20. This plate 32 has openings 34 therein in a position to receive the ends of the projections 20, as shown. Each opening 34 is larger than the projection to form an annular passage 36 through which the other propellant, for example, the fuel, is discharged in surrounding relation to the discharge of the first propellant through the nozzles 24. The space between the plates 14 and 32 forms a chamber 38 from which the second propellant is discharged and this chamber communicates by a radial passage 40 with a propellant inlet 42. The plates 32 and 14 are held in spaced relation as by spacers 44 surrounding bolts 13 and brazed to the peripheral flanges 46 and 48 on the plates 14 and 32, respectively.

The flanges 46 and 48 held apart by the spacers 44 define the radial passage 40 which communicates with the propellant inlet 42. This latter includes an annular ring 50 or manifold surrounding the injector head and in effect integral with the flanges 46 and 48. The inlet 42 is attached to the ring manifold 50, as shown. With this arrangement, propellant from the manifold 50 flows radially inward through chamber 38, thereby cooling the surface of plate 32 as it flows over this plate. Further, this arrangement for supplying the propellant to chamber 38 also serves as the peripheral attachment of the injector head to the rocket wall.

At its inner edge, plate 32 may have an integral sleeve 51 fitting within sleeve 16 and suitable attached as by brazing.

The arrangement of the plate 14 with the integral projections forms a dividing wall between the two propellants so that in operation flow of either propellant into the respective inlets 29 or 42 will not result in an intermingling of these propellants except within the main rocket chamber 8 where such intermingling is not detrimental. Also, leakage from any of the attachment joints will release propellant only to atmosphere or to the main chamber thereby avoiding any accumulation of a combustible mixture in a closed space. In effect, the device is free of any brazed or welded joints between the two propellants.

It is to be understood that the invention is not limited to the specific embodiment herein illustrated and described, but may be used in other ways without departure from its spirit as defined by the following claims.

We claim:

1. An injector head for a rocket chamber having a side wall, said head having a main plate attached to said side wall, said plate having integral projections on one side thereof, a second plate spaced from said first plate to form a chamber therebetween, said projections extending through said chamber, said second plate having openings to receive the ends of said projections and cooperating with said projections to form annular discharge passages from the chamber between said plates, said plates having flanges on their outer edges, said flanges being connected to said side wall and being spaced apart to form an inlet to said chamber, spacer elements connecting said flanges and holding them in spaced relation, attachment means for attaching said flanges and said spacer to said side wall, and a manifold surrounding and connected to said flanges for supplying a propellant to said chamber.

2. An injector head as in claim 1 wherein a cap is mounted on the first plate on the side opposite to said second plate, said cap having a flange on its periphery for attachment to the periphery of the main plate, said cap defining with said first plate a second chamber, and said projections having passages therein for a flow of propellant from said second chamber to the remote side of said second plate.

References Cited in the file of this patent

UNITED STATES PATENTS

| | | |
|---|---|---|
| 2,741,085 | Prentiss | Apr. 10, 1956 |
| 2,874,539 | Fox | Feb. 24, 1959 |